(12) United States Patent
Syu

(10) Patent No.: US 12,345,951 B2
(45) Date of Patent: Jul. 1, 2025

(54) WIDE-ANGLE LENS ASSEMBLY

(71) Applicants: SINTAI OPTICAL (SHENZHEN) CO., LTD., Guangdong (CN); ASIA OPTICAL CO., INC., Taichung (TW)

(72) Inventor: Yan-jie Syu, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 575 days.

(21) Appl. No.: 17/664,392

(22) Filed: May 20, 2022

(65) Prior Publication Data
US 2022/0390722 A1 Dec. 8, 2022

(30) Foreign Application Priority Data
Jun. 3, 2021 (CN) .......................... 202110617752.2

(51) Int. Cl.
*G02B 9/64* (2006.01)
*G02B 13/00* (2006.01)
*G02B 13/06* (2006.01)

(52) U.S. Cl.
CPC ........... *G02B 9/64* (2013.01); *G02B 13/0045* (2013.01); *G02B 13/06* (2013.01)

(58) Field of Classification Search
None
See application file for complete search history.

(56) References Cited

U.S. PATENT DOCUMENTS

| 7,405,885 B2* | 7/2008 | Kang ................. G02B 15/1425 |
| | | 359/691 |
| 8,964,312 B2 | 2/2015 | Kawamura |
| 2018/0143411 A1 | 5/2018 | Minefuji |

FOREIGN PATENT DOCUMENTS

| CN | 107728292 A | 2/2018 |
| CN | 111796402 A | 10/2020 |
| TW | 201930954 A | 8/2019 |

OTHER PUBLICATIONS

Chinese Office Action issued in corresponding Taiwan Patent Application No. 110120312 dated Dec. 13, 2021, pp. 1-5.

* cited by examiner

*Primary Examiner* — Dung T Nguyen
(74) *Attorney, Agent, or Firm* — PV IP PC; Wei Te Chung; Christopher S. Ruprecht

(57) ABSTRACT

Provided is a wide-angle lens assembly including, in an order from an object side to an image side along an optical axis, a first lens element with negative refractive power, having an image-side surface being concave; a second lens element with negative refractive power, having an image-side surface being concave; a third lens element with negative refractive power; a fourth lens element with positive refractive power; a fifth lens element with a refractive power; a sixth lens element with positive refractive power, having an object-side surface being convex and an image-side surface being convex; a seventh lens element with negative refractive power; and an eighth lens element with positive refractive power, having an object-side surface being convex and an image-side surface being convex. The wide-angle lens assembly is characterized by small size, excellent resolution and great environmental tolerance.

19 Claims, 13 Drawing Sheets

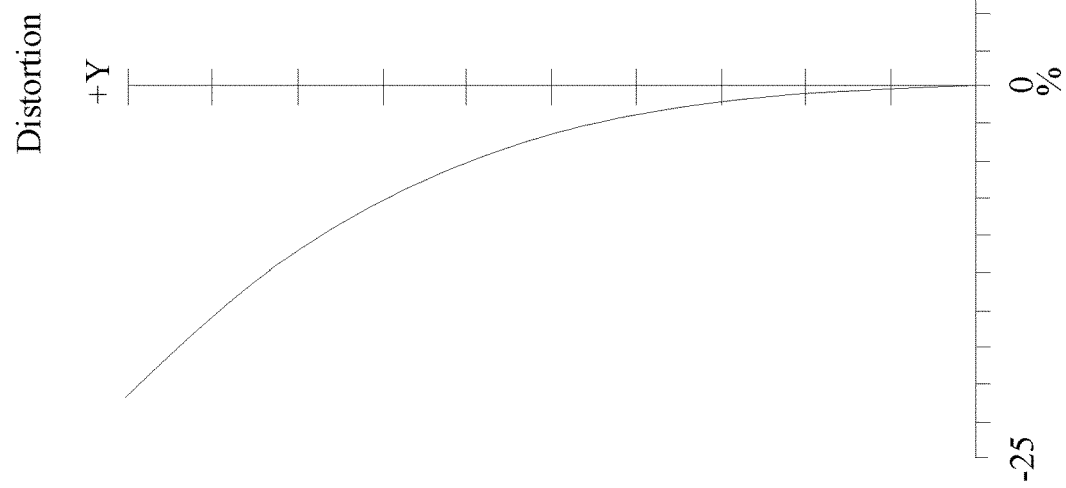
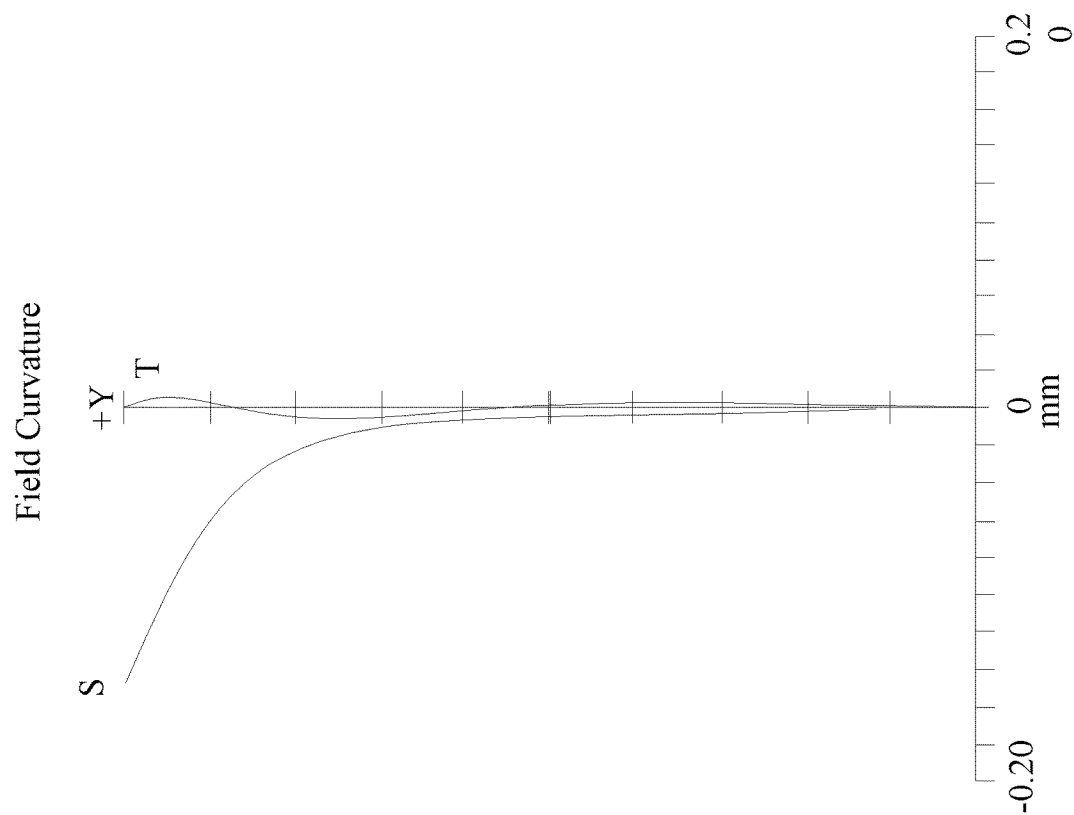

WIDE-ANGLE LENS ASSEMBLY

CROSS REFERENCE TO RELATED APPLICATION

This application claims priority to China Patent Application No. 202110617752.2, filed on Jun. 3, 2021, which is incorporated herein by reference in its entirety.

TECHNICAL FIELD

The present invention relates to an optical component, and more particularly to a wide-angle lens assembly.

BACKGROUND

In recent years, image capturing devices have been widely used and have specifications becoming more and more diversified with different application requirements. Particularly, the demand for wide-angle lens assembly with a large field of view is on a steady increase in current market. In addition, this type of lens assembly is also developed to be small in size and have good resolution. On the other hand, in order for the wide-angle lens assembly to have consistent performance under different environments and to ensure high performance in high- and low-temperature environments, a wide-angle lens assembly that is resistant to environment changes is indispensable. Therefore, there is an urgent need for a lens assembly with a large field of view, small size, high image quality and great environmental tolerance. This type of lens assembly is applicable to automotive lens, monitor, aerial camera, sports photography equipment, head-mounted camera and various electronic products equipped with camera, etc.

SUMMARY

The objective of the present invention is to provide a wide-angle lens assembly, which is characterized by small size, excellent resolution and great environmental tolerance.

In an aspect, the present invention provides a wide-angle lens assembly including, in an order from an object side to an image side along an optical axis: a first lens element with negative refractive power, having an image-side surface being concave; a second lens element with negative refractive power, having an image-side surface being concave; a third lens element with negative refractive power; a fourth lens element with positive refractive power; a fifth lens element with a refractive power; a sixth lens element with positive refractive power, having an object-side surface being convex and an image-side surface being convex; a seventh lens element with negative refractive power; and an eighth lens element with positive refractive power, having an object-side surface being convex and an image-side surface being convex, wherein the wide-angle lens assembly satisfies the following condition: $21.02 \leq f4+f6 \leq 26.89$, wherein f4 is effective focal length of the fourth lens element and f6 is effective focal length of the sixth lens element.

In another aspect, the present invention provides a wide-angle lens assembly including, in an order from an object side to an image side along an optical axis: a first lens element with negative refractive power, having an image-side surface being concave; a second lens element with negative refractive power, having an image-side surface being concave; a third lens element with negative refractive power; a fourth lens element with positive refractive power; a fifth lens element with a refractive power; a sixth lens element with positive refractive power, having an object-side surface being convex and an image-side surface being convex; a seventh lens element with negative refractive power; and an eighth lens element with positive refractive power, having an object-side surface being convex and an image-side surface being convex, wherein the wide-angle lens assembly satisfies the following condition: $18.66 \leq f4+f8 \leq 23.13$, wherein f4 is effective focal length of the fourth lens element and f8 is effective focal length of the eighth lens element.

In the wide-angle lens assembly of the present invention, the object-side surface of the third lens element is concave, the image-side surface of the fifth lens element is convex, and the image-side surface of the seventh lens element is concave.

In the wide-angle lens assembly of the present invention, the image-side surface of the third lens element is concave, and the object-side surface of the seventh lens element is convex.

In the wide-angle lens assembly of the present invention, the image-side surface of the third lens element is convex, and the object-side surface of the fifth lens element is concave.

In the wide-angle lens assembly of the present invention, the image-side surface of the third lens element is convex, and the object-side surface of the seventh lens element is concave.

In the wide-angle lens assembly of the present invention, the object-side surface of the fifth lens element is convex.

The wide-angle lens assembly of the present invention further includes an aperture stop disposed between two adjacent lens elements among the first lens element to the eighth lens element, wherein a lens element disposed along a direction from the aperture stop to the object side is a lens element located in front of the aperture stop, a lens element disposed along a direction from the aperture stop to the image side is a lens element located behind the aperture stop, and wherein at least one lens element is located in front of the aperture stop, and at least one lens element is located behind the aperture stop.

In the wide-angle lens assembly of the present invention, the wide-angle lens assembly at least satisfies one of the following conditions: $-0.64 \leq (G7R2+G6R2)/GAR1 \leq -0.03$; $-5 \leq (GBR1+G6R2)/G7R2 \leq 16$; $-50 \leq GBR2+G3R2 \leq 28$; and $-0.72 \leq G7R2/VB \leq 2.15$, wherein GAR1 is a radius of curvature of the object-side surface of a first one of lens elements located in front of the aperture stop, GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G6R2 is a radius of curvature of the image-side surface of the sixth lens element, G7R2 is a radius of curvature of the image-side surface of the seventh lens element, and VB is an Abbe number of a first one of lens elements located behind the aperture stop.

In the wide-angle lens assembly of the present invention, the wide-angle lens assembly at least satisfies one of the following conditions: $-25.66 \leq f4+f3 \leq -5.19$; $-0.06 \leq (G7R1/G3R2)/G5R1 \leq 0.12$; and $-1.29 \leq (G7R2-G6R2)/f3 \leq -0.62$, wherein f3 is effective focal length of the third lens element, f4 is effective focal length of the fourth lens element, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, and G7R2 is a radius of curvature of the image-side surface of the seventh lens element.

The wide-angle lens assembly of the present invention further includes a ninth lens element disposed between the first lens element and the third lens element, wherein the ninth lens element has negative refractive power and has an object-side surface being convex and an image-side surface being concave.

The wide-angle lens assembly of the present invention is characterized by small size, excellent resolution and great environmental tolerance and has advantages of small curvature of image surfaces and excellent performance of color aberration under magnification. Therefore, the wide-angle lens assembly of the present invention satisfies the needs of high image quality.

BRIEF DESCRIPTION OF THE DRAWINGS

FIGS. 5A, 5B, 5C and 5D are diagrams showing a wide-angle lens assembly, field curvature, distortion and longitudinal aberration respectively in accordance with a fourth embodiment of the present invention.

DETAILED DESCRIPTION

To make above objectives, features and advantages and others of the present invention more clearly and apparently, the present invention will be described in details below using embodiments in conjunction with the appending drawings.

The present invention provides a wide-angle lens assembly having advantages of small curvature of image surfaces and excellent performance of color aberration under magnification. The wide-angle lens assembly can satisfy the needs of a large field of view, small size, high image quality and great environmental tolerance and is applicable to automotive lens, monitor, aerial camera, sports photography equipment, head-mounted camera and various electronic products equipped with camera, etc.

Figure 1:
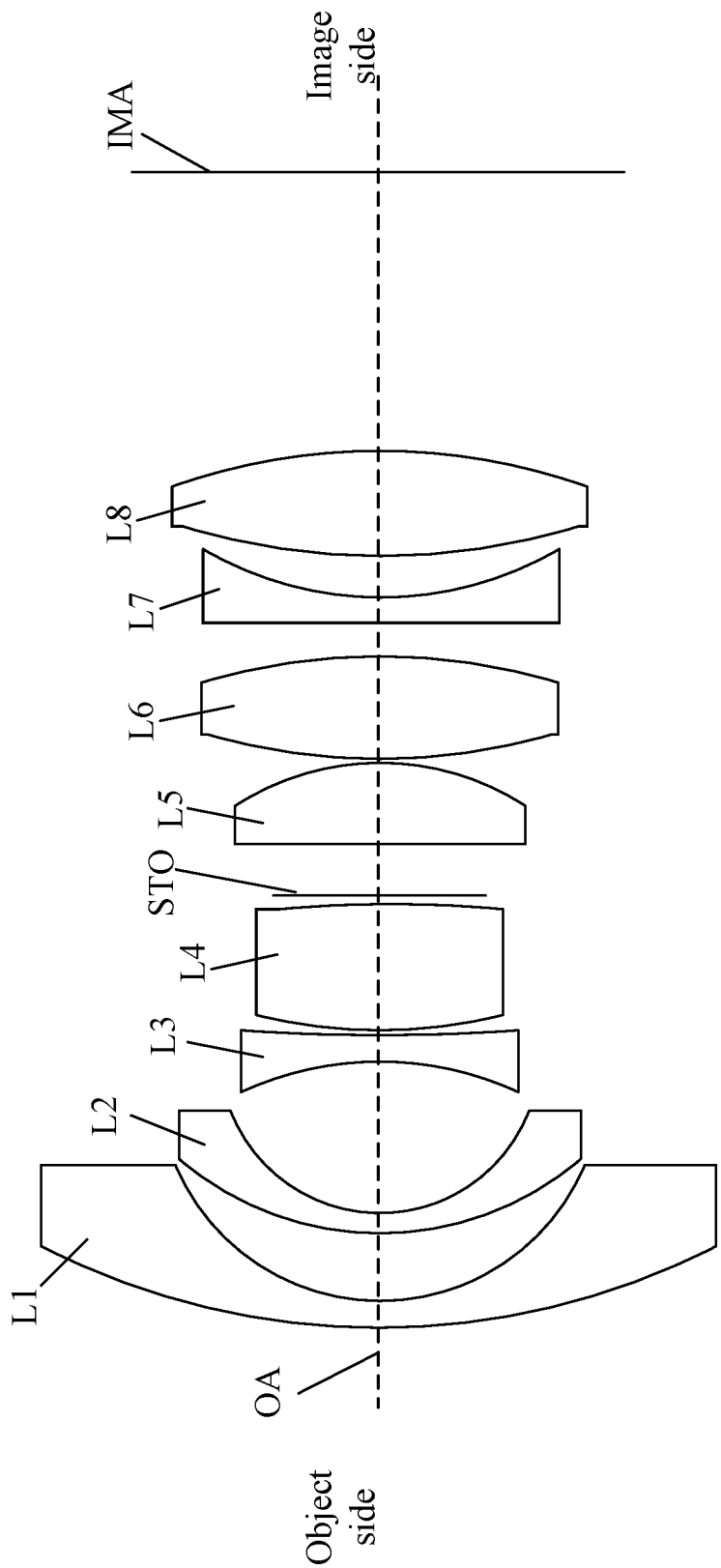
FIG. 1 is a schematic diagram showing a wide-angle lens assembly in accordance with the present invention.

FIG. 1 is a schematic diagram showing a wide-angle lens assembly in accordance with the present invention. As shown in FIG. 1, the wide-angle lens assembly of the present invention includes two lens groups, that is, a first lens group located in front of the aperture stop STO and a second lens group located behind the aperture stop STO. In an exemplary example, the first lens group includes, in an order from the object side to the image side along the optical axis OA, a first lens element L1, a second lens element L2, a third lens element L3 and a fourth lens element L4. The second lens group includes, in an order from the object side to the image side along the optical axis OA, a fifth lens element L5, a sixth lens element L6, a seventh lens element L7 and an eighth lens element L8. However, the present invention is not limited to this deployment. The first lens group and the second lens group may also include other number of lens elements, for example, the first lens element includes five lens elements and the second lens group includes four lens elements. After passing through the first lens group, the aperture stop STO and the second lens group, the light rays from the object side form an image on an image plane IMA. A piece of protective glass (not shown) may be provided between the second lens group and the image plane IMA. The protective glass may be a color filter. In an exemplary example, the wide-angle lens assembly has a single focal point and is an optical system with fixed focal length.

In the aspect of lens constitution, with regard to the first lens group, the first lens element L1 is a lens with negative refractive power, e.g., a meniscus lens, and the image-side surface of the first lens element L1 is concave; the second lens element L2 is a lens with negative refractive power, e.g., a meniscus lens, and the image-side surface of the second lens element L2 is concave; the third lens element L3 is a lens with negative refractive power, e.g., a biconcave lens or a meniscus lens; the fourth lens element L4 is a lens with positive refractive power, e.g., a biconvex lens. With regard to the second lens group, the fifth lens element L5 is a lens with a refractive power, e.g., a lens with positive refractive power (e.g., a biconvex lens or a meniscus lens); the sixth lens element L6 is a lens with positive refractive power, e.g., a biconvex lens, and the object-side surface of the sixth lens element L6 is convex and the image-side surface of the sixth lens element L6 is convex; the seventh lens element L7 is a lens with negative refractive power, e.g., a biconcave lens or a meniscus lens; the eighth lens element L8 is a lens with positive refractive power, e.g., a biconvex lens, and the object-side surface of the eighth lens element L8 is convex and the image-side surface of the eighth lens element L8 is convex. In the wide-angle lens assembly of the present invention, the refractive power of the first lens element to the eighth lens element L1-L8 is negative, negative, negative, positive, positive, positive, negative and positive in order. In addition, a ninth lens element may be provided between the first lens element L1 and the third lens element L3 (more specifically, between the first lens element L1 and the second lens element L2) of the first lens group (see fourth embodiment) such that in the wide-angle lens assembly the refractive power is negative, negative, negative, negative, positive, positive, positive, negative and positive in an order from the left to the right. The field of view of such an optical lens can reach 222 degrees, and the total length of the lens assembly can be designed as about 20 mm to 35 mm, thereby satisfying the needs of a large field of view and small size. In addition, most of or all of the lens elements can be made of glass with resistance to temperature changes, and thus the lens assembly has great environmental tolerance.

In order to enable the wide-angle lens assembly of the present invention to possess an excellent optical performance, the wide-angle lens assembly of the present invention can further satisfy the following condition (1):

$$21.02 \leq f4+f6 \leq 26.89,$$

wherein f4 is effective focal length of the fourth lens element and f6 is effective focal length of the sixth lens element. The condition (1) is beneficial to control the focal length of the fourth lens element L4 and the focal length of the sixth lens element L6 so as to gather light rays and help decrease the angle of major light rays on the image plane IMA and increase an amount of light at the periphery. The wide-angle lens assembly satisfying the condition (1) has excellent imaging performance and high quality of imaging.

In order to enable the wide-angle lens assembly of the present invention to possess an excellent optical performance, the wide-angle lens assembly of the present invention can further satisfy the following condition (2):

$$18.66 \le f4+f8 \le 23.13,$$

wherein f4 is effective focal length of the fourth lens element and f8 is effective focal length of the eighth lens element. The condition (2) is beneficial to control the focal length of the fourth lens element L4 and the focal length of the eighth lens element L8 so as to gather light rays and help decrease the angle of major light rays on the image plane IMA and increase an amount of light at the periphery. The wide-angle lens assembly satisfying the condition (2) has excellent imaging performance and high quality of imaging.

In an embodiment, both the object-side surface of the first lens element L1 and the object-side surface of the second lens element L2 are convex. The first lens element L1 is designed to have negative refractive power and have an object-side surface being convex. In this way, it is beneficial to form a retro-focus structure to allow the light rays with a large entrance angle to enter this optical system. The second lens element L2 is designed to have negative refractive power to share the burden of negative refractive power of the first lens element L1, and to have an object-side surface being convex for aberration correction.

In an embodiment, both the object-side surface and the image-side surface of the fourth lens element L4 are convex. That is, the fourth lens element L4 is a biconvex lens, which can provide major capability of gathering light rays for the system and help reduce the total length of the lens assembly.

In an embodiment, the object-side surface of the third lens element L3 is concave, the image-side surface of the fifth lens element L5 is convex, and the image-side surface of the seventh lens element L7 is concave. The third lens element L3 is designed to have negative refractive power and have an object-side surface being convex. In this way, it is beneficial to ease light rays with a large entrance angle. The fifth lens element L5 is designed to have positive refractive power and have an image-side surface being convex. In this way, it is beneficial to strengthen the property of short focal length of the wide-angle system. In an embodiment, the third lens element L3 is a biconcave lens, the seventh lens element L7 is a meniscus lens, the image-side surface of the third lens element L3 is concave, and the object-side surface of the seventh lens element L7 is convex. In an embodiment, the third lens element L3 is a meniscus lens with negative refractive power, the fifth lens element L5 is a meniscus lens with positive refractive power, the image-side surface of the third lens element L3 is convex, and the object-side surface of the fifth lens element L5 is concave. In an embodiment, the third lens element L3 is a meniscus lens, the seventh lens element L7 is a biconcave lens, the image-side surface of the third lens element L3 is convex, and the object-side surface of the seventh lens element L7 is concave. In an embodiment, the fifth lens element L5 is a biconvex lens, and the object-side surface of the fifth lens element L5 is convex.

In an embodiment, in order further to maintain optical performance, the wide-angle lens assembly of the present invention may satisfy the following condition (3):

$$-25.66 \le f4+f3 \le -5.19,$$

wherein f3 is effective focal length of the third lens element L3 and f4 is effective focal length of the fourth lens element L4. The condition (3) is beneficial to control the focal length of the third lens element L3 and the fourth lens element L4 and thus helps improve the quality of imaging. The wide-angle lens assembly satisfying the condition (3) has small curvature of image surfaces, in which the image will not be over distorted when being projected onto the image plane, and has excellent performance of color aberration under magnification, in which an increase of magnification will not affect color deviation too much. This range is an inevitable condition to have a great ability to reduce color aberration and resist image distortion.

In an embodiment, in order further to maintain optical performance, the wide-angle lens assembly of the present invention may satisfy the following condition (4):

$$-1.29 \le (G7R2-G6R2)/f3 \le -0.62,$$

wherein f3 is effective focal length of the third lens element L3, G6R2 is a radius of curvature of the image-side surface of the sixth lens element L6, and G7R2 is a radius of curvature of the image-side surface of the seventh lens element L7. The condition (4) is beneficial to control the focal length of the third lens element L3 and the radius of curvature of the image-side surfaces of the sixth lens element L6 and the seventh lens element L7 and thus helps improve the quality of imaging. The wide-angle lens assembly satisfying the condition (4) has small curvature of image surfaces, in which the image will not be over distorted when being projected onto the image plane IMA, and has excellent performance of color aberration under magnification, in which an increase of magnification will not affect color deviation too much. This range is an inevitable condition to have a great ability to reduce color aberration and resist image distortion. In an embodiment, in order further to maintain optical performance, the wide-angle lens assembly of the present invention may satisfy the following condition (5):

$$-0.06 \le (G7R1/G3R2)/G5R1 \le 0.12,$$

wherein G3R2 is a radius of curvature of the image-side surface of the third lens element L3, G5R1 is a radius of curvature of the object-side surface of the fifth lens element L5, and G7R1 is a radius of curvature of the object-side surface of the seventh lens element L7. By this way, the color aberration and distortion under magnification can be further corrected, and thus the quality of imaging is improved. This range is an inevitable condition to have a great ability to reduce color aberration and resist image distortion.

In an embodiment, the aperture stop STO is provided between two adjacent lens elements among the first lens element to the eighth lens element L1-L8. In the present invention, a lens element disposed along a direction from the aperture stop STO to the object side is defined as a lens element located in front of the aperture stop STO, that is, a lens element in the first lens group, and a lens element disposed along a direction from the aperture stop STO to the image side is a lens element located behind the aperture stop STO, that is, a lens element in the second lens group. Each of the first lens group and the second lens group includes at least one lens element, that is, at least one lens element is located in front of the aperture stop STO and at least one lens element is located behind the aperture stop STO.

In an embodiment, in order further to maintain optical performance, the wide-angle lens assembly of the present invention may satisfy the following condition (6):

$$-5 \le (GBR1+G6R2)/G7R216 \le 16,$$

wherein GBR1 is a radius of curvature of the object-side surface of a first one of lens elements (e.g., the fifth lens element L5 in FIG. 1) located behind the aperture stop STO, G6R2 is a radius of curvature of the image-side surface of the sixth lens element L6, and G7R2 is a radius of curvature of the image-side surface of the seventh lens element L7. By this way, the curvature of image surfaces can be further corrected, and thus the image will not be over distorted when being projected onto the image plane IMA. This range is an inevitable condition to have a great ability to resist image distortion.

In an embodiment, in order further to maintain optical performance, the wide-angle lens assembly of the present invention may satisfy the following condition (7):

$$-0.64 \leq (G7R2+G6R2)/GAR1 \leq -0.03,$$

wherein GAR1 is a radius of curvature of the object-side surface of a first one of lens elements (e.g., the fourth lens element L4 in FIG. 1) located in front of the aperture stop STO, G6R2 is a radius of curvature of the image-side surface of the sixth lens element L6, and G7R2 is a radius of curvature of the image-side surface of the seventh lens element L7. By this way, the color aberration and distortion under magnification can be further corrected, and thus the quality of imaging is improved. This range is an inevitable condition to have a great ability to reduce color aberration and resist image distortion.

In an embodiment, in order further to maintain optical performance, the wide-angle lens assembly of the present invention may satisfy the following condition (8):

$$-0.72 \leq G7R2 \leq 2.15,$$

wherein VB is an Abbe number of a first one of lens elements (e.g., the fifth lens element L5 in FIG. 1) located behind the aperture stop STO, and G7R2 is a radius of curvature of the image-side surface of the seventh lens element L7. By this way, longitudinal color aberration can be corrected. This range is an inevitable condition to have a great ability to reduce color aberration.

In an embodiment, in order further to maintain optical performance, the wide-angle lens assembly of the present invention may satisfy the following condition (9):

$$-50 \leq GBR2+G3R2 \leq 28,$$

wherein GBR2 is a radius of curvature of the image-side surface of a first one of lens elements (e.g., the fifth lens element L5 in FIG. 1) located behind the aperture stop STO, and G3R2 is a radius of curvature of the image-side surface of the third lens element L3. By this way, spherical aberration can be corrected. This range is an inevitable condition to have great performance of spherical aberration.

In an embodiment, the first lens group of the wide-angle lens assembly of the present invention includes at least three concave lens elements. For example, among the first lens element to the eighth lens element L1-L8, there are at least three lens elements located in front of the aperture stop STO and the at least three lens elements are concave lens elements. By this way, it is beneficial to correct longitudinal color aberration.

In an embodiment, the second lens group of the wide-angle lens assembly of the present invention includes at least three convex lens elements. Among the first lens element to the eighth lens element L1-L8, there are at least three lens elements located behind the aperture stop STO and the at least three lens elements are convex lens elements. By this way, it is beneficial to correct spherical aberration.

In an embodiment, the wide-angle lens assembly of the present invention has at least one lens element that is an aspheric lens. For example, among the first lens element to the eighth lens element L1-L8, there is at least one lens element that is an aspheric lens. By this way, the total length of the wide-angle lens assembly can be effectively controlled and at the same time it satisfies the needs of photographing distanced objects.

Both the object-side surface and the image-side surface of each of the lens elements L1-L8 in the wide-angle lens assembly of the present invention can be aspheric surfaces. The use of aspheric surfaces can have more console variables to reduce aberration. Alternatively, some lens elements can be plastic lenses, which may keep excellent image resolving quality while lowering the cost. Of course, these lens elements can be implemented by composite lenses made of plastic or glass. A composite lens is realized by two lenses adhered to each other without an air gap.

The shape of an aspheric lens can be expressed by the following formula:

$$D = \frac{C \cdot H^2}{1 + \sqrt{1-(1+K) \cdot C^2 \cdot H^2}} + E_4 H^4 + E_6 H^6 + E_8 H^8 + E_{10} H^{10} + E_{12} H^{12}$$

wherein D represents the sag of a point on the aspheric surface at a height distanced to a central axis of the lens; C is a reciprocal of a paraxial curvature radius; H represents a height of a point on the aspheric surface with respect to the central axis; K is the conic constant of the aspheric lens; and E4 to E12 are aspheric surface coefficients for even (greater than or equal to four) order terms, where E is a scientific notation, for example, E-03 represents $10^{-3}$.

The wide-angle lens assembly of the present invention will be further detailed with reference to the embodiments in the followings.

First Embodiment

Figure 2A:
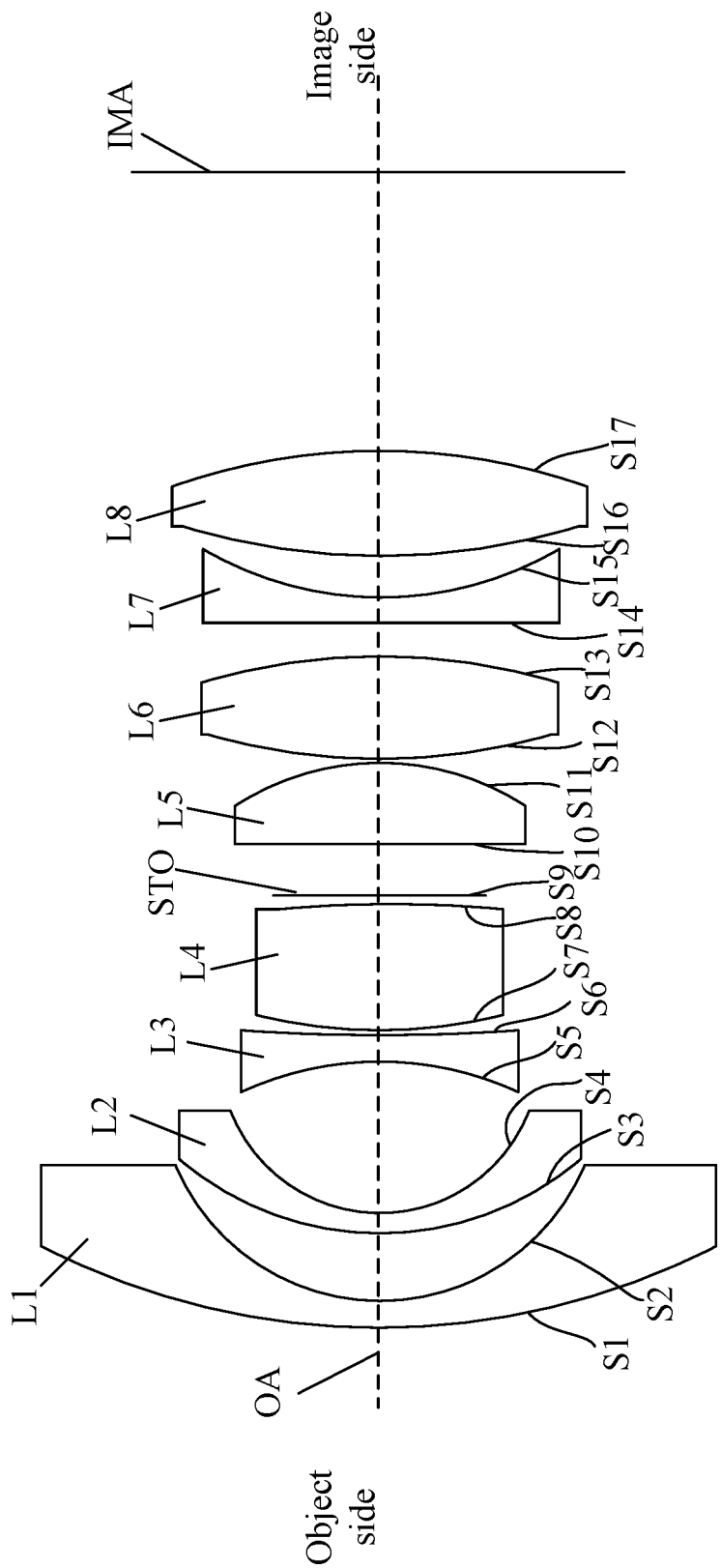
FIGS. 2A, 2B, 2C and 2D are diagrams showing a wide-angle lens assembly, field curvature, distortion and longitudinal aberration respectively in accordance with a first embodiment of the present invention.
Figure 2C:
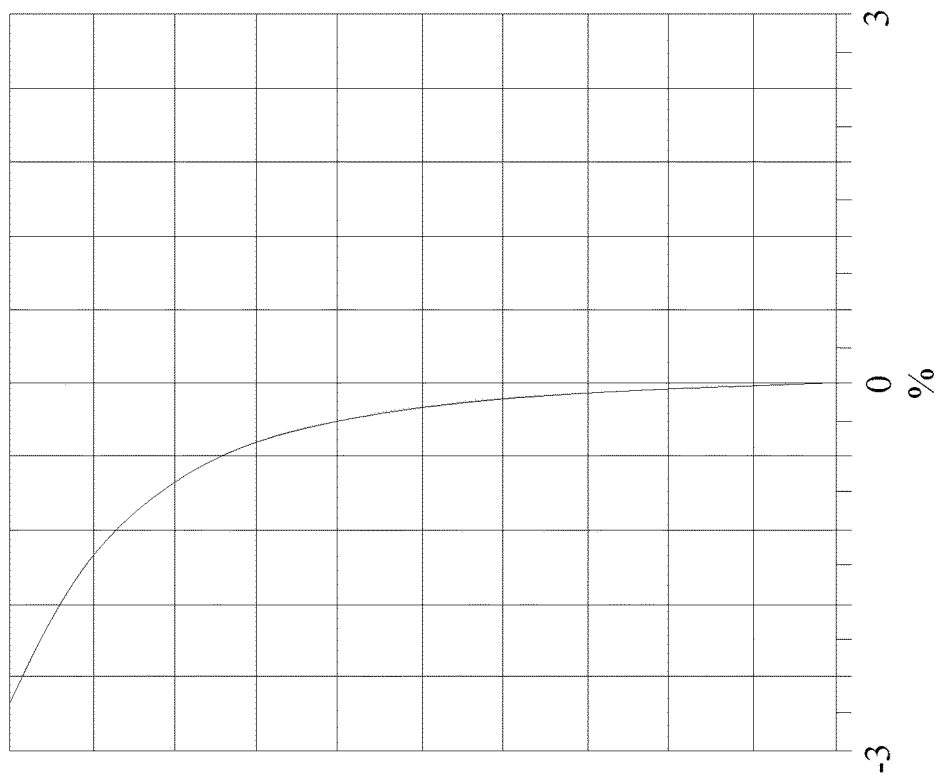
Figure 2B:
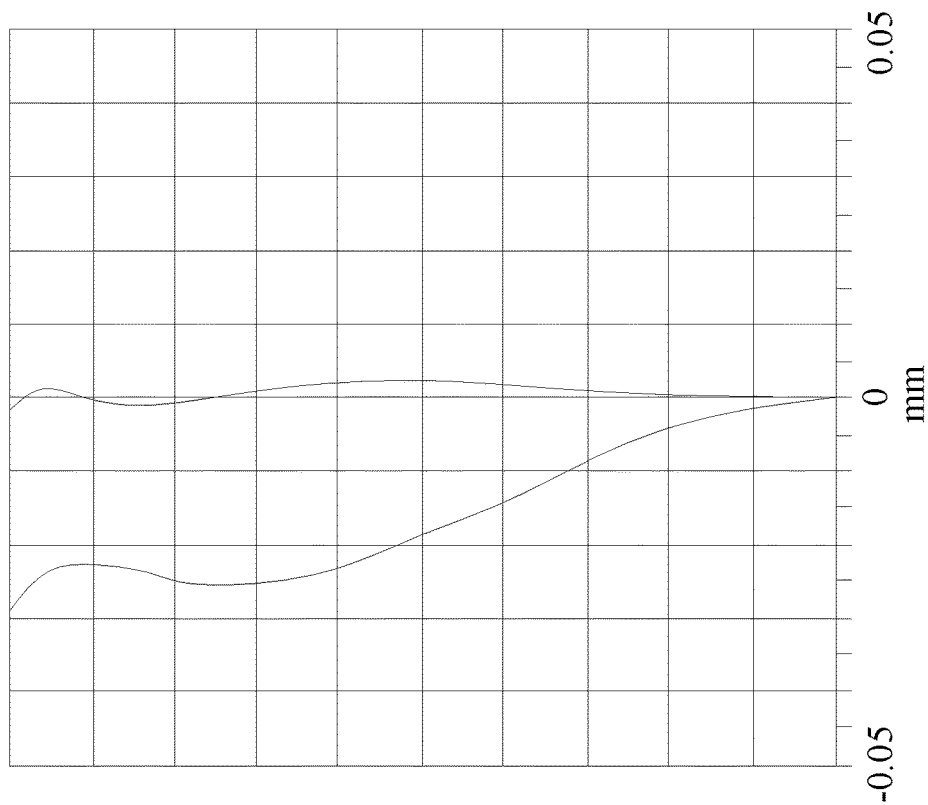
Figure 2D:
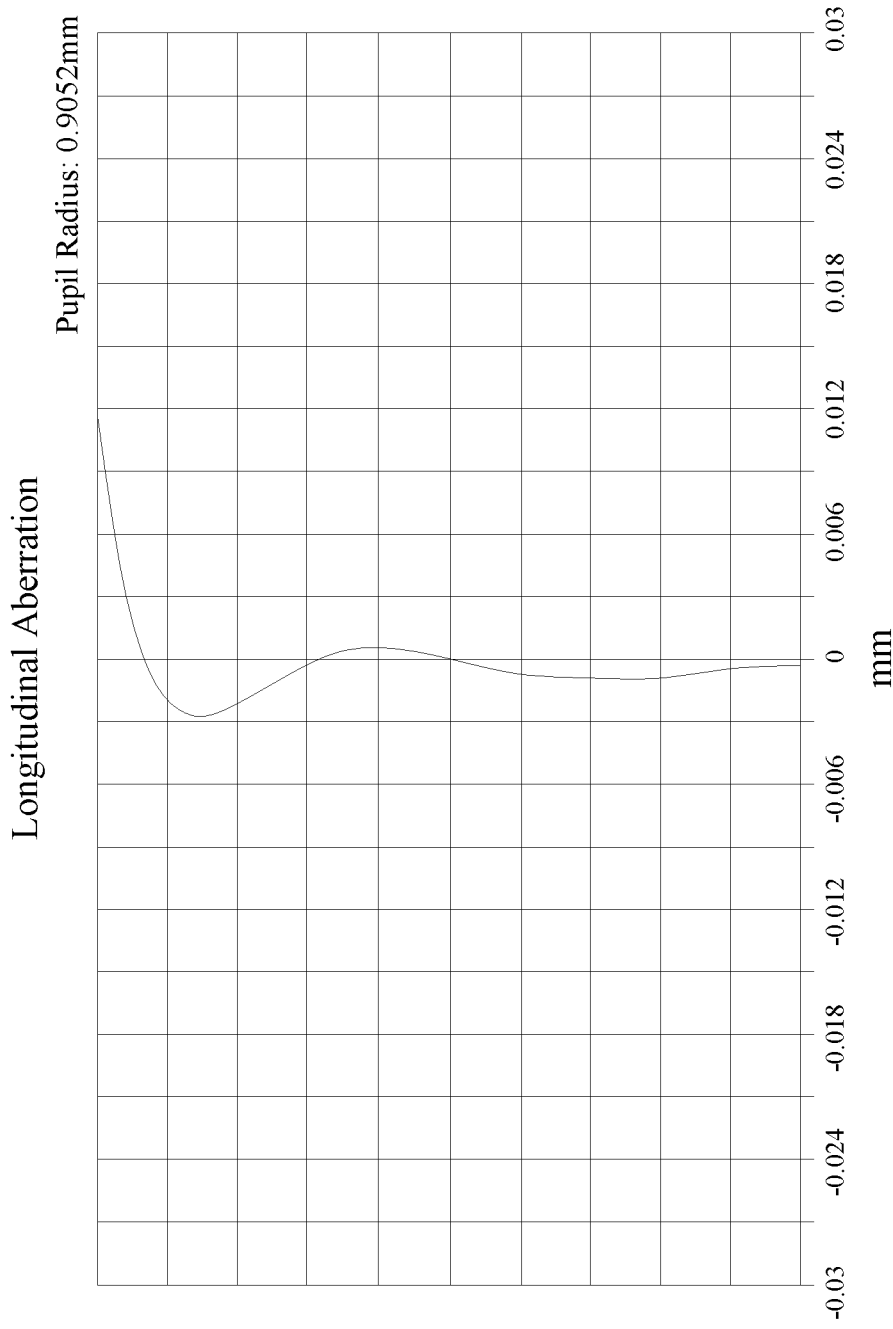

Please refer to FIGS. 2A to 2D. FIG. 2A is a schematic diagram showing a wide-angle lens assembly according to a first embodiment of the present invention, and FIGS. 2B to 2D are diagrams illustrating distortion, field curvature, and longitudinal aberration according to the first embodiment of the present invention, respectively. In the wide-angle lens assembly of the first embodiment of the present invention, referring to FIG. 2A, the first lens group located in front of the aperture stop STO is of a framework having four lens elements (i.e., L1 to L4), and the second lens group located behind the aperture stop STO is also of a framework having four lens elements (e.g., L5 to L8). In the first lens group, both the first lens element L1 and the second lens element L2 are meniscus lenses and in particular, are convex-concave lenses, that is, both the image-side surfaces of the first lens element L1 and the second lens element L2 are concave. The third lens element L3 is a biconcave lens, and the fourth lens element L4 is a biconvex lens. The first lens group has three concave lens elements, and thus it is beneficial to correct longitudinal color aberration. In the second lens group, all of the fifth lens element L5, the sixth lens element L6 and the eighth lens element L8 are biconvex lenses, and the seventh lens element L7 is a meniscus lens and in particular, is a convex-concave lens, that is, the image-side surface of the seventh lens element L7 is concave. The second lens group has three convex lens elements, and thus it is beneficial to correct spherical aberration.

Related parameters of the wide-angle lens assembly and each lens element are listed in Table 1, and related parameters of aspheric surfaces in Table 1 are listed in Table 2. It can be known from Table 2 that the fourth lens element L4 and the eighth lens element L8 are aspheric lenses in this embodiment.

TABLE 1

Effective focal length = 3.33 mm F-number = 1.842
Total length = 23.92 mm Field of view = 180.16 degrees

| Surface No. | Radius of curvature (mm) | Distance (mm) | Refractive Index Nd | Abbe No. Vd | Effective focal length (mm) |
|---|---|---|---|---|---|
| S1  | 15.56    | 0.55 | 1.76 | 52.00 | −10.87 |
| S2  | 4.61     | 1.35 |      |       |        |
| S3  | 6.34     | 0.47 | 1.60 | 70.00 | −12.14 |
| S4  | 3.37     | 3.11 |      |       |        |
| S5  | −6.85    | 0.57 | 1.45 | 90.00 | −29.95 |
| S6  | 33.03    | 0.09 |      |       |        |
| S7  | 13.26    | 2.61 | 1.72 | 30.00 | 14.06  |
| S8  | −14.59   | 0.18 |      |       |        |
| S9  | Infinity | 1.02 |      |       |        |
| S10 | 128.15   | 1.76 | 1.46 | 90.00 | 13.42  |
| S11 | −5.52    | 0.07 |      |       |        |
| S12 | 12.60    | 2.11 | 1.60 | 70.00 | 11.95  |
| S13 | −12.99   | 0.66 |      |       |        |
| S14 | 193.88   | 0.60 | 2.00 | 18.00 | −7.48  |
| S15 | 7.43     | 0.85 |      |       |        |
| S16 | 13.74    | 2.18 | 1.80 | 50.00 | 8.87   |
| S17 | −11.73   | 5.75 |      |       |        |

TABLE 2

| Surface No. | K | E4 | E6 | E8 | E10 |
|---|---|---|---|---|---|
| S7  |       | 9.64E−04  | 3.28E−05 | 2.38E−06  | −3.4E−07 |
| S8  |       | 2.10E−03  | 9.19E−05 | −7.25E−06 | 8.53E−07 |
| S16 |       | −3.37E−04 | 1.53E−05 | −3.23E−08 |          |
| S17 | 1.883 | 1.62E−04  | 8.16E−06 | 2.60E−07  |          |

Parameters relating to above conditions (1) to (9) for the wide-angle lens assembly of the first embodiment are listed in Table 3.

TABLE 3

| GAR1 | GBR1 | GBR2 | G3R2 | G6R2 | G7R2 | VB |
|---|---|---|---|---|---|---|
| 13.26 | 128.15 | −5.52 | 33.03 | −12.99 | 7.43 | 90.00 |

| G7R1 | G5R1 | f3 | f4 | f6 | f8 |
|---|---|---|---|---|---|
| 193.88 | 128.15 | −29.95 | 14.06 | 11.95 | 8.87 |

The values calculated based on conditions (1) to (9) for the parameters of the wide-angle lens assembly of the first embodiment are listed in Table 4. It can be seen from Table 4 that the wide-angle lens assembly of the first embodiment satisfies conditions (1) to (9).

TABLE 4

| Condition (1) | Condition (2) | Condition (3) | Condition (4) | Condition (5) |
|---|---|---|---|---|
| 26.01 | 22.93 | −15.89 | −0.68 | 0.05 |

TABLE 4-continued

| Condition (6) | Condition (7) | Condition (8) | Condition (9) |
|---|---|---|---|
| 15.50 | −0.42 | 0.08 | 27.51 |

In addition, the wide-angle lens assembly of the first embodiment meets the requirements of optical performance. It can be seen from FIG. 2B that the field curvature ranges from −0.03 mm to 0.005 mm. It can be seen from FIG. 2C that the distortion ranges from −3% to 0%. It can be seen from FIG. 2D that the longitudinal aberration ranges from −0.003 mm to 0.012 mm. It is apparent that the field curvature, distortion and longitudinal aberration of the wide-angle lens assembly of the first embodiment can be corrected effectively and resolution is excellent.

Second Embodiment

Figure 3A:
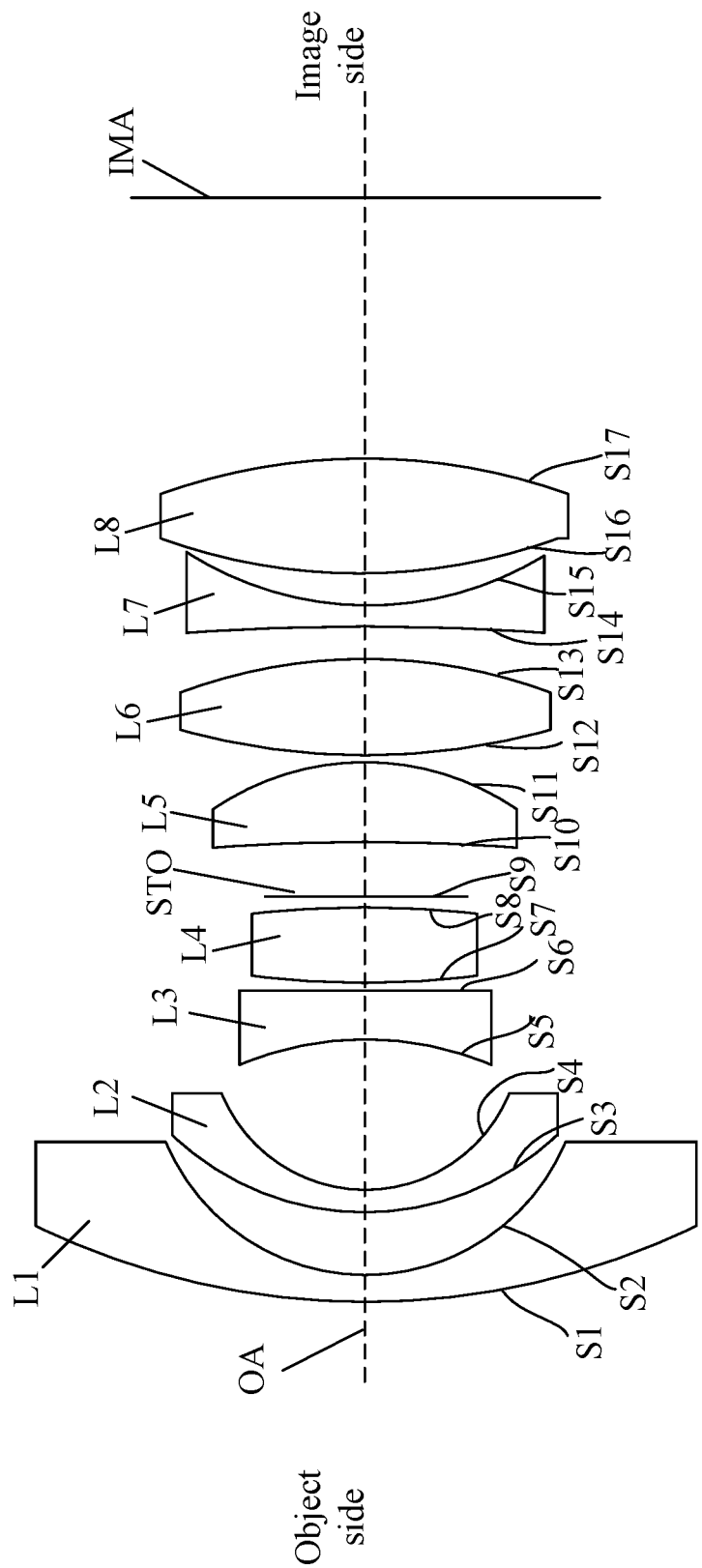
FIGS. 3A, 3B, 3C and 3D are diagrams showing a wide-angle lens assembly, field curvature, distortion and longitudinal aberration respectively in accordance with a second embodiment of the present invention.
Figure 3C:
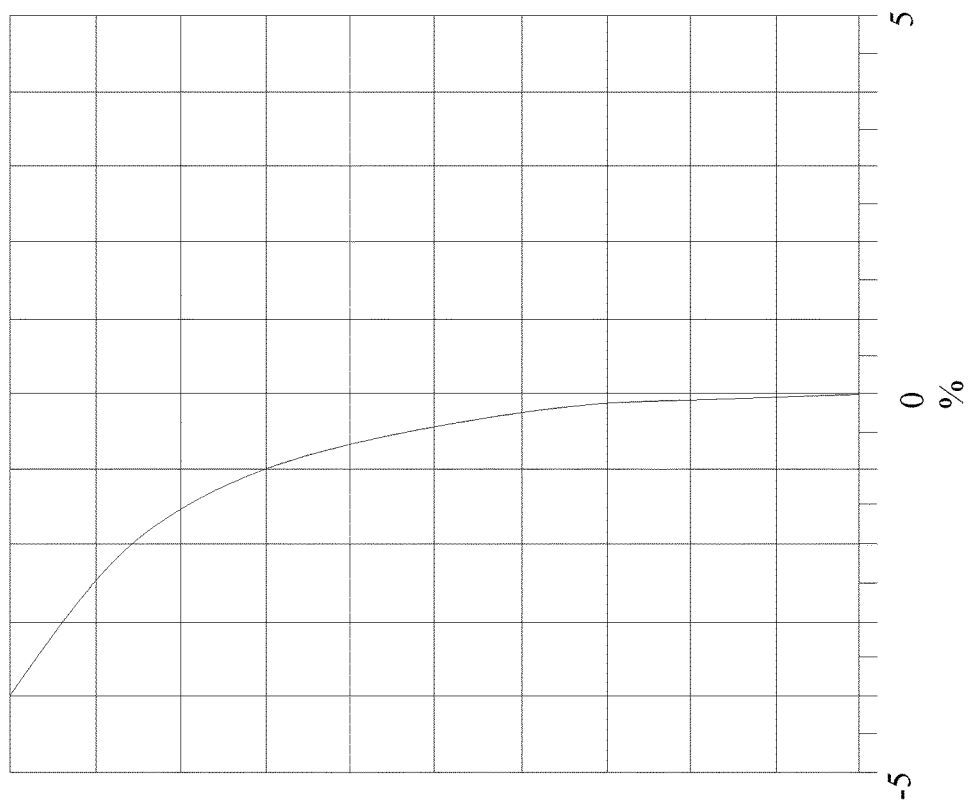
Figure 3B:
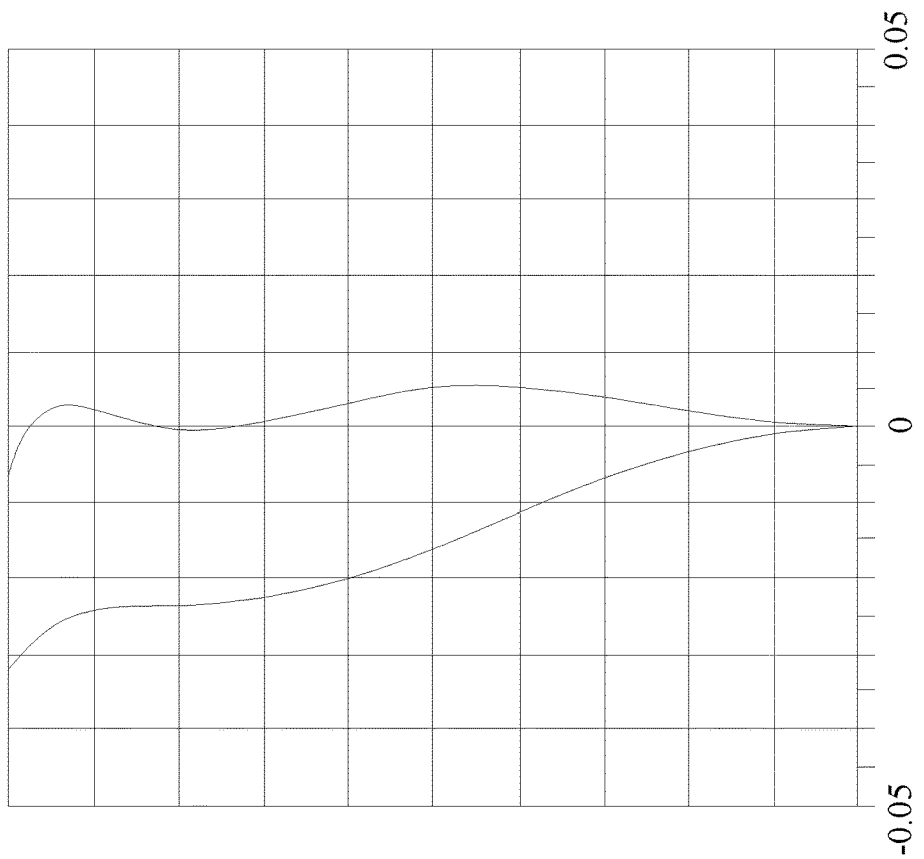
Figure 3D:
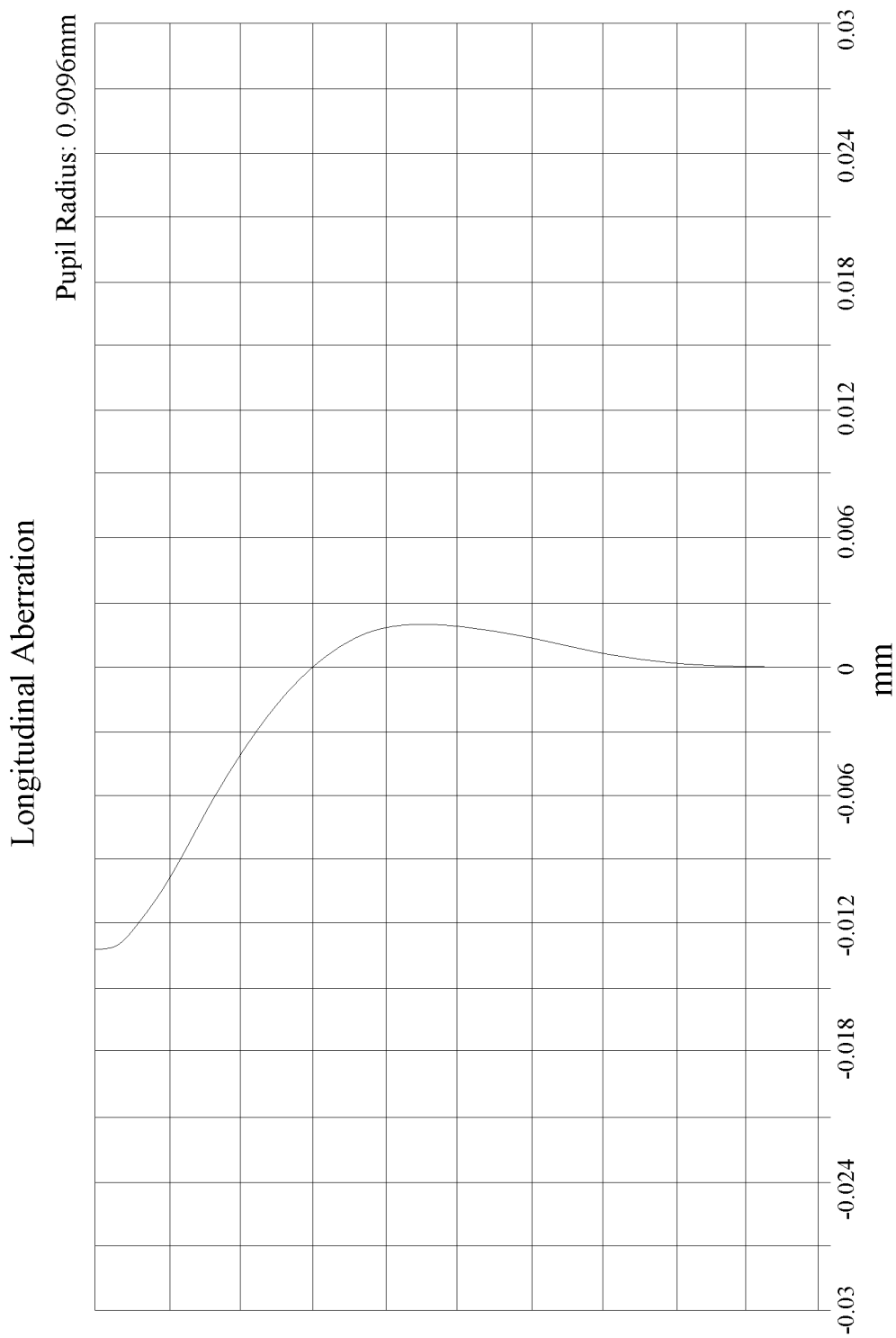

Please refer to FIGS. 3A to 3D. FIG. 3A is a schematic diagram showing a wide-angle lens assembly according to a second embodiment of the present invention, and FIGS. 3B to 3D are diagrams illustrating distortion, field curvature, and longitudinal aberration according to the second embodiment of the present invention, respectively. The light wavelength used in this measurement is 0.555 um. Different from the first embodiment, referring to FIG. 3A, in the wide-angle lens assembly of the second embodiment of the present invention, the third lens element L3 and the fifth lens element L5 are meniscus lenses and in particular, are concave-convex lenses, and the seventh lens element L7 is a biconcave lens. As the same as the Vt first embodiment, the first lens group and the second lens group have three concave lens elements and three convex lens elements, respectively.

Related parameters of the wide-angle lens assembly and each lens element are listed in Table 5, and related parameters of aspheric surfaces in Table 5 are listed in Table 6. It can be known from Table 6 that the fourth lens element L4 and the eighth lens element L8 are aspheric lenses in this embodiment.

TABLE 5

Effective focal length = 3.347 mm F-number = 1.84
Total length = 23.91 mm Field of view = 180.16 degrees

| Surface No. | Radius of curvature (mm) | Distance (mm) | Refractive Index Nd | Abbe No. Vd | Effective focal length (mm) |
|---|---|---|---|---|---|
| S1  | 16.07    | 0.56 | 1.75 | 52.00 | −8.88  |
| S2  | 4.65     | 1.39 |      |       |        |
| S3  | 6.14     | 0.45 | 1.60 | 65.00 | −13.49 |
| S4  | 3.40     | 3.25 |      |       |        |
| S5  | −7.08    | 1.13 | 1.50 | 81.00 | −17.01 |
| S6  | −43.88   | 0.12 |      |       |        |
| S7  | 29.00    | 1.67 | 1.72 | 30.00 | 10.89  |
| S8  | −10.58   | 0.21 |      |       |        |
| S9  | Infinity | 1.18 |      |       |        |
| S10 | −26.87   | 1.71 | 1.60 | 70.00 | 12.30  |
| S11 | −5.94    | 0.18 |      |       |        |
| S12 | 14.67    | 2.11 | 1.60 | 70.00 | 10.40  |
| S13 | −10.32   | 0.65 |      |       |        |
| S14 | −50.20   | 0.53 | 2.00 | 18.00 | −6.69  |
| S15 | 7.85     | 0.62 |      |       |        |
| S16 | 11.63    | 2.48 | 1.77 | 50.00 | 7.98   |
| S17 | −11.92   | 5.67 |      |       |        |

TABLE 6

| Surface No. | K | E4 | E6 | E8 | E10 |
|---|---|---|---|---|---|
| S7 |  | 8.58E−04 | 9.64E−05 | 1.08E−06 | −3.8E−07 |
| S8 |  | 2.19E−03 | 1.12E−04 | −3.40E−07 | 1.17E−07 |
| S16 |  | −2.93E−04 | 1.21E−05 | −3.60E−08 |  |
| S17 | 1.603 | 2.40E−04 | 5.41E−06 | 2.58E−07 |  |

Parameters relating to above conditions (1) to (9) for the wide-angle lens assembly of the second embodiment are listed in Table 7.

TABLE 7

| GAR1 | GBR1 | GBR2 | G3R2 | G6R2 | G7R2 | VB |
|---|---|---|---|---|---|---|
| 29.00 | −26.87 | −5.94 | −43.88 | −10.32 | 7.85 | 70.00 |

| G7R1 | G5R1 | f3 | f4 | f6 | f8 |
|---|---|---|---|---|---|
| −50.20 | −26.87 | −17.01 | 10.89 | 10.4 | 7.98 |

The values calculated based on conditions (1) to (9) for the parameters of the wide-angle lens assembly of the second embodiment are listed in Table 8. It can be seen from Table 8 that the wide-angle lens assembly of the second embodiment satisfies conditions (1) to (9).

TABLE 8

| Condition (1) | Condition (2) | Condition (3) | Condition (4) | Condition (5) |
|---|---|---|---|---|
| 21.29 | 18.87 | −6.12 | −1.07 | −0.04 |

| Condition (6) | Condition (7) | Condition (8) | Condition (9) |
|---|---|---|---|
| −4.74 | −0.09 | 0.11 | −49.82 |

In addition, the wide-angle lens assembly of the second embodiment meets the requirements of optical performance. It can be seen from FIG. 3B that the field curvature ranges from −0.035 mm to 0.005 mm. It can be seen from FIG. 3C that the distortion ranges from −4% to 0%. It can be seen from FIG. 3D that the longitudinal aberration ranges from −0.015 mm to 0.003 mm. It is apparent that the field curvature, distortion and longitudinal aberration of the wide-angle lens assembly of the second embodiment can be corrected effectively and resolution is excellent.

Third Embodiment

Figure 4A:
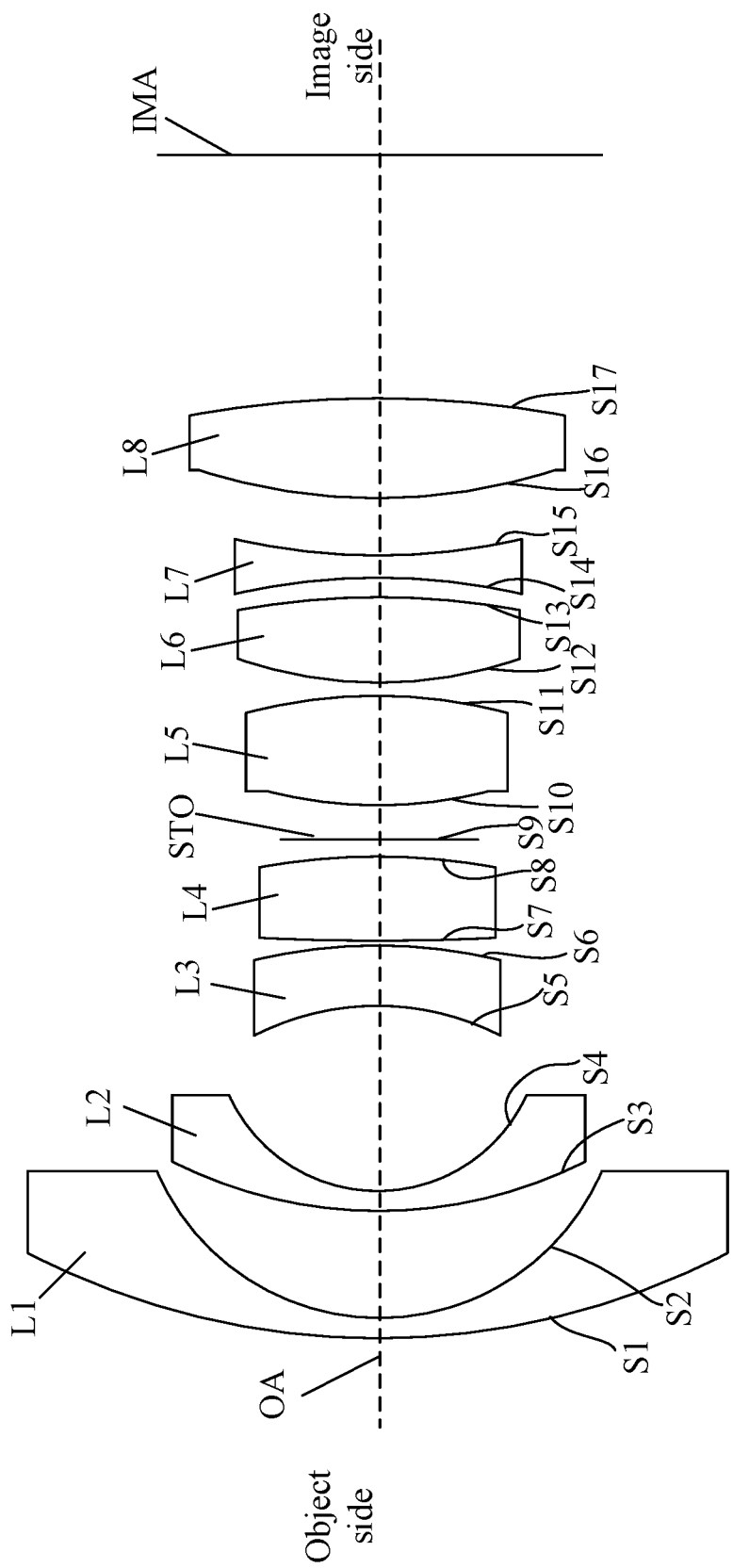
FIGS. 4A, 4B, 4C and 4D are diagrams showing a wide-angle lens assembly, field curvature, distortion and longitudinal aberration respectively in accordance with a third embodiment of the present invention.
Figure 4C:
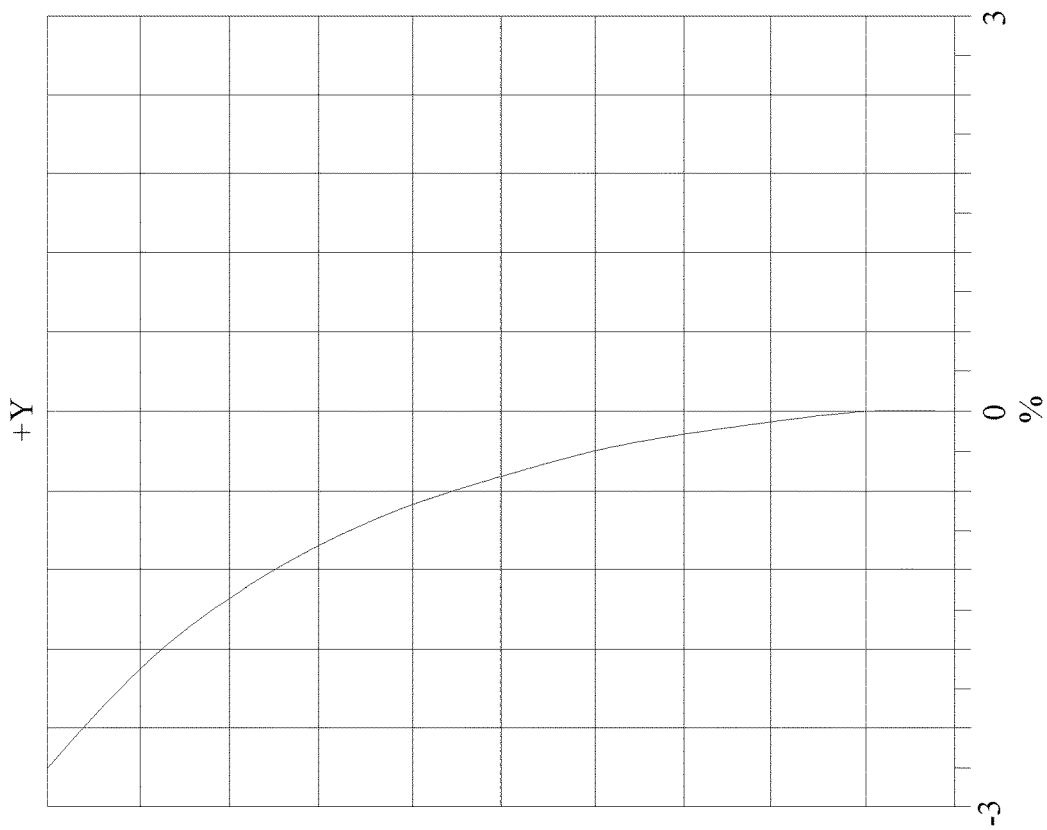
Figure 4B:
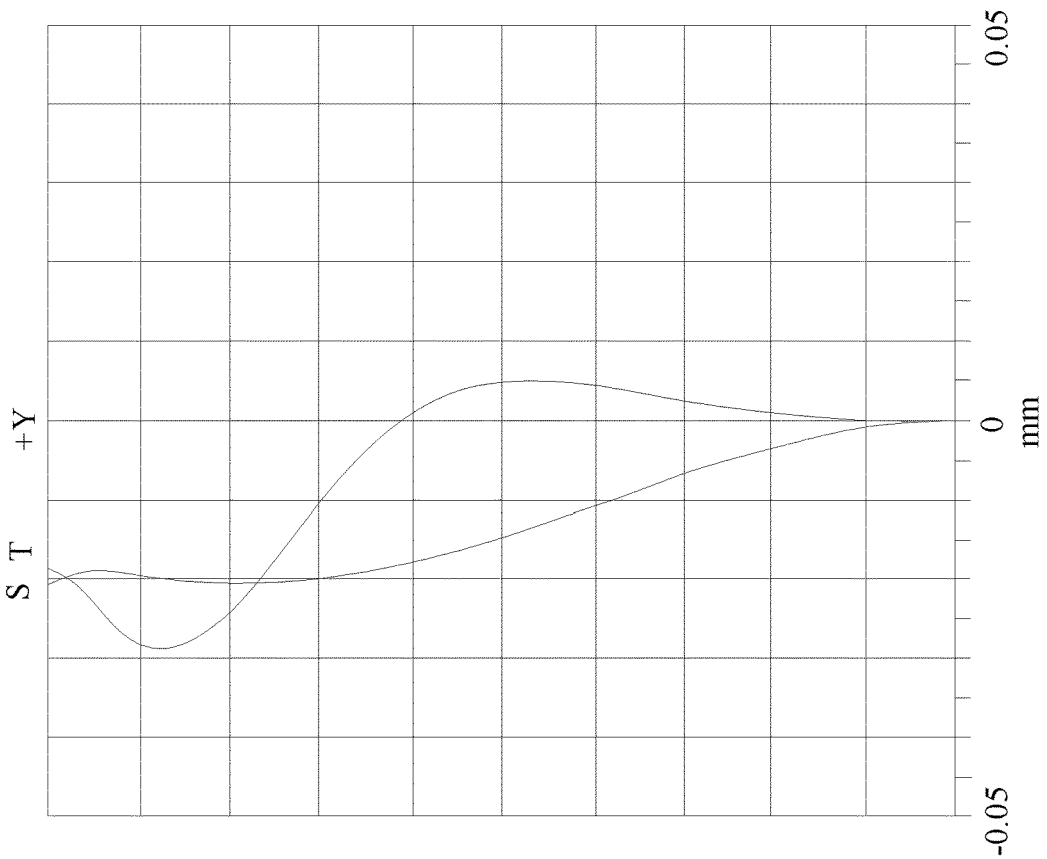
Figure 4D:
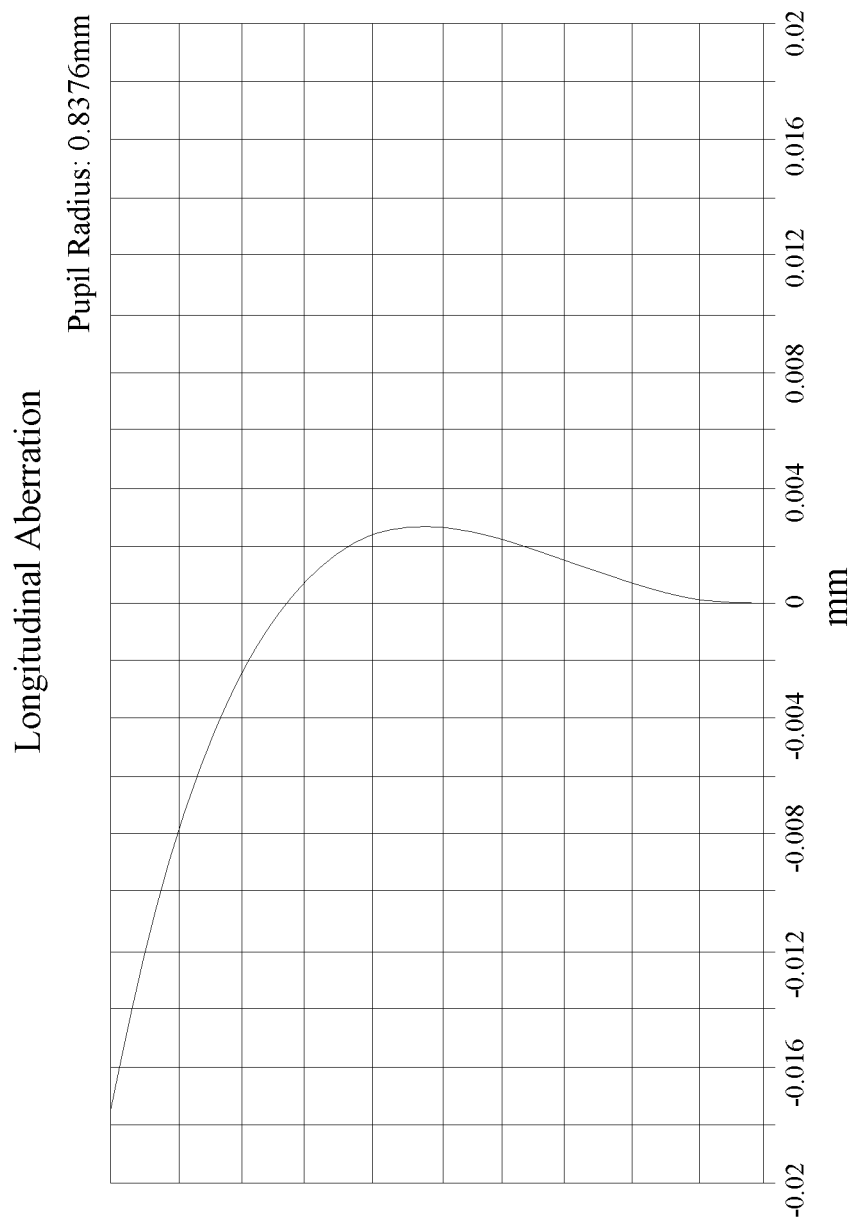

Please refer to FIGS. 4A to 4D. FIG. 4A is a schematic diagram showing a wide-angle lens assembly according to a third embodiment of the present invention, and FIGS. 4B to 4D are diagrams illustrating distortion, field curvature, and longitudinal aberration according to the third embodiment of the present invention, respectively. The light wavelength used in this measurement is 0.555 um. Different from the first embodiment, referring to FIG. 4A, in the wide-angle lens assembly of the third embodiment of the present invention, the third lens element L3 is a meniscus lens and in particular, is a concave-convex lens, the fifth lens element L5 is a biconvex lens, and the seventh lens element L7 is a biconcave lens. As the same as the Vt first embodiment, the first lens group and the second lens group have three concave lens elements and three convex lens elements, respectively.

Related parameters of the wide-angle lens assembly and each lens element are listed in Table 9, and related parameters of aspheric surfaces in Table 9 are listed in Table 10. It can be known from Table 10 that the eighth lens element L8 is an aspheric lens in this embodiment.

TABLE 9

Effective focal length = 3.35 mm F-number = 2.0
Total length = 27.5 mm Field of view = 182 degrees

| Surface No. | Radius of curvature (mm) | Distance (mm) | Refractive Index Nd | Abbe No. Vd | Effective focal length (mm) |
|---|---|---|---|---|---|
| S1 | 17.87 | 0.50 | 1.77 | 50.00 | −10.86 |
| S2 | 5.64 | 2.42 |  |  |  |
| S3 | 10.05 | 0.50 | 1.50 | 80.00 | −12.35 |
| S4 | 3.77 | 4.29 |  |  |  |
| S5 | −6.01 | 1.41 | 1.50 | 90.00 | −27.12 |
| S6 | −11.62 | 0.10 |  |  |  |
| S7 | 90.51 | 1.94 | 1.80 | 26.00 | 14.18 |
| S8 | −12.95 | 0.55 |  |  |  |
| S9 | Infinity | 0.66 |  |  |  |
| S10 | 12.42 | 2.50 | 1.50 | 90.00 | 12.82 |
| S11 | −12.42 | 0.38 |  |  |  |
| S12 | 10.44 | 1.95 | 1.60 | 70.00 | 11.57 |
| S13 | −19.43 | 0.44 |  |  |  |
| S14 | −14.30 | 0.53 | 2.00 | 18.00 | −7.01 |
| S15 | 14.30 | 1.32 |  |  |  |
| S16 | 11.25 | 2.38 | 1.80 | 50.00 | 8.61 |
| S17 | −16.25 | 5.63 |  |  |  |

TABLE 10

| Surface No. | K | E4 | E6 | E8 |
|---|---|---|---|---|
| S16 | −0.426 | −5.50E−04 | 1.34E−05 | −4.15E−07 |
| S17 | 0.454 | 2.82E−04 | 5.62E−06 | −1.51E−07 |

Parameters relating to above conditions (1) to (9) for the wide-angle lens assembly of the third embodiment are listed in Table 11.

TABLE 11

| GAR1 | GBR1 | GBR2 | G3R2 | G6R2 | G7R2 | VB |
|---|---|---|---|---|---|---|
| 90.51 | 12.42 | −12.42 | −11.62 | −19.43 | 14.30 | 90.00 |

| G7R1 | G5R1 | f3 | f4 | f6 | f8 |
|---|---|---|---|---|---|
| −14.30 | 12.42 | −27.12 | 14.18 | 11.57 | 8.61 |

The values calculated based on conditions (1) to (9) for the parameters of the wide-angle lens assembly of the third embodiment are listed in Table 12. It can be seen from Table 12 that the wide-angle lens assembly of the third embodiment satisfies conditions (1) to (9).

TABLE 12

| Condition (1) | Condition (2) | Condition (3) | Condition (4) | Condition (5) |
|---|---|---|---|---|
| 25.75 | 22.79 | −12.94 | −1.24 | 0.10 |

| Condition (6) | Condition (7) | Condition (8) | Condition (9) |
|---|---|---|---|
| −0.49 | −0.06 | 0.16 | −24.04 |

In addition, the wide-angle lens assembly of the third embodiment meets the requirements of optical performance. It can be seen from FIG. 4B that the field curvature ranges from −0.03 mm to 0.005 mm. It can be seen from FIG. 4C that the distortion ranges from −3% to 0%. It can be seen from FIG. 4D that the longitudinal aberration ranges from −0.018 mm to 0.004 mm. It is apparent that the field curvature, distortion and longitudinal aberration of the wide-angle lens assembly of the third embodiment can be corrected effectively and resolution is excellent.

Fourth Embodiment

Figure 5A:
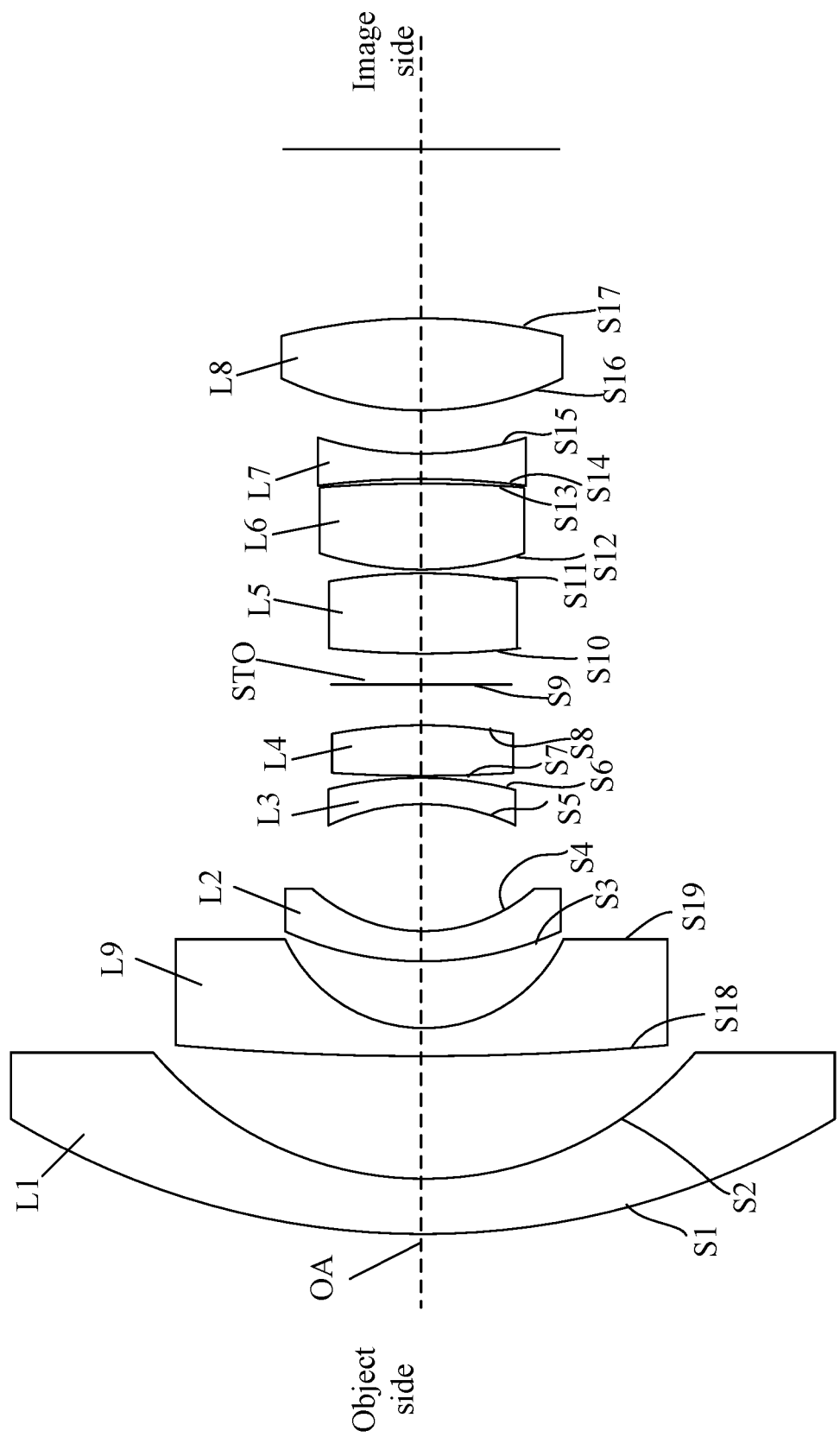
Figure 5D:
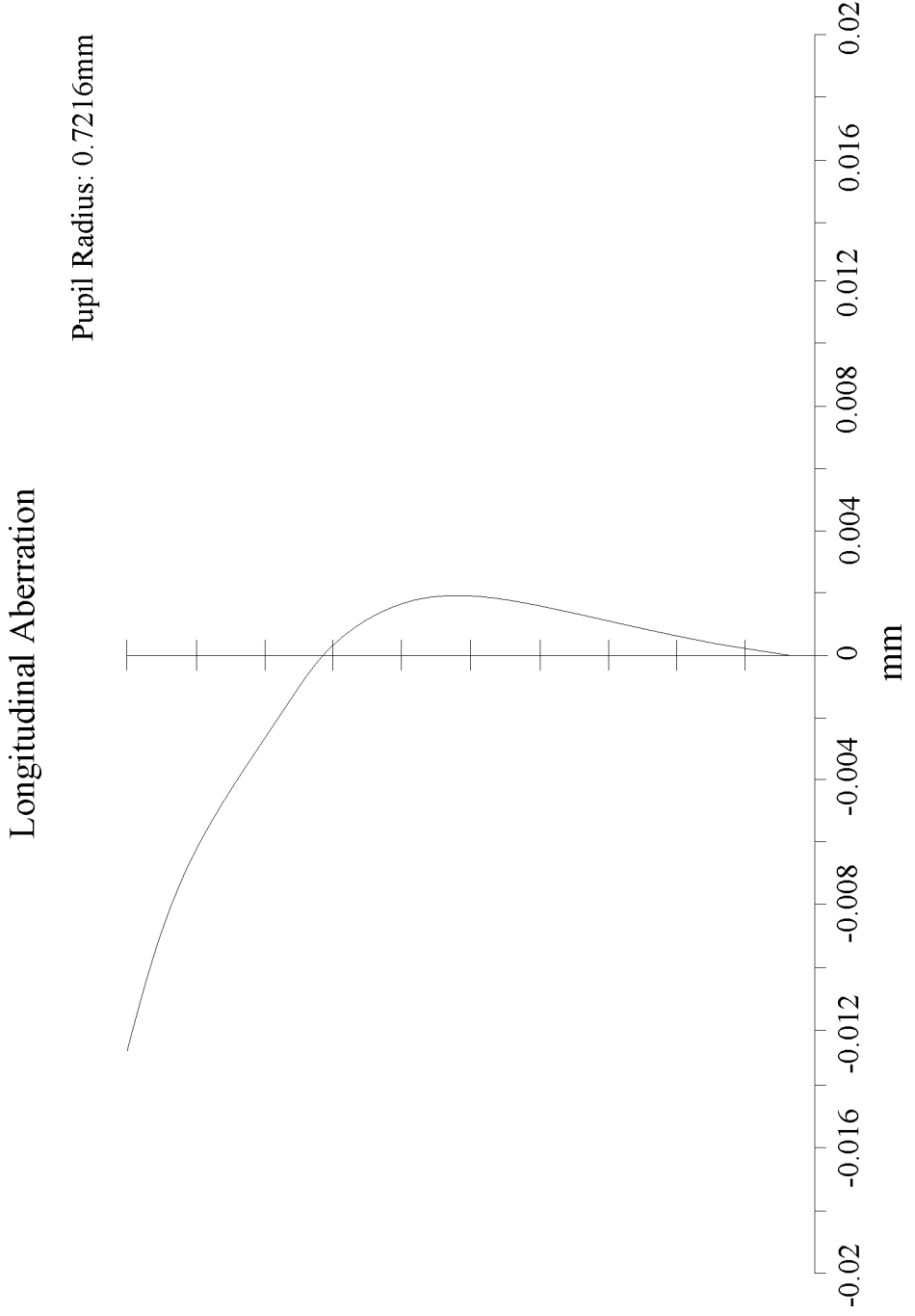

Please refer to FIGS. 5A to 5D. FIG. 5A is a schematic diagram showing a wide-angle lens assembly according to a fourth embodiment of the present invention, and FIGS. 5B to 5D are diagrams illustrating distortion, field curvature, and longitudinal aberration according to the fourth embodiment of the present invention, respectively. The light wavelength used in this measurement is 0.555 um. Different from the third embodiment, referring to FIG. 5A, the wide-angle lens assembly of the fourth embodiment of the present invention further includes a ninth lens element L9, which is arranged in the first lens group and is located between the first lens element L1 and the second lens element L2. The ninth lens element L9 has negative refractive power and has an object-side surface being convex and an image-side surface being concave. In the wide-angle lens assembly of the fourth embodiment of the present invention, the refractive power is negative, negative, negative, negative, positive, positive, positive, negative and positive in an order from the left to the right. The first lens group has four concave lens elements and the second lens group has three convex lens elements.

Related parameters of the wide-angle lens assembly and each lens element are listed in Table 13, and related parameters of aspheric surfaces in Table 13 are listed in Table 14. It can be known from Table 14 that the eighth lens element L8 is an aspheric lens in this embodiment.

TABLE 13

Effective focal length = 2.886 mm F-number = 2.0
Total length = 35 mm Field of view = 222 degrees

| Surface No. | Radius of curvature (mm) | Distance (mm) | Refractive Index Nd | Abbe No. Vd | Effective focal length (mm) |
|---|---|---|---|---|---|
| 1 | 25.07 | 1.72 | 1.83 | 43 | −23.93 |
| 2 | 10.76 | 3.96 | | | |
| 18 | 79.73 | 0.92 | 1.5 | 82 | −10.44 |
| 19 | 4.89 | 2.13 | | | |
| 3 | 11.00 | 0.97 | 1.5 | 82 | −19.85 |
| 4 | 5.07 | 4.14 | | | |
| 5 | −6.54 | 0.82 | 1.45 | 90 | −37.95 |
| 6 | −11.00 | 0.07 | | | |
| 7 | 37.08 | 1.68 | 1.76 | 27 | 13.22 |
| 8 | −13.63 | 1.44 | | | |
| 9 | Infinity | 0.86 | | | |
| 10 | 22.27 | 2.62 | 1.6 | 70 | 14.79 |
| 11 | −14.17 | 0.09 | | | |
| 12 | 10.22 | 2.77 | 1.6 | 70 | 13.4 |
| 13 | −34.24 | 0.15 | | | |
| 14 | −21.23 | 0.86 | 2 | 17 | −7.39 |
| 15 | 11.77 | 1.36 | | | |
| 16 | 8.36 | 2.96 | 1.7 | 58 | 7.76 |
| 17 | −13.36 | 5.48 | | | |

TABLE 14

| Surface No. | K | E4 | E6 | E8 |
|---|---|---|---|---|
| S16 | 0.407 | −6.43E−04 | 1.35E−05 | −3.27E−07 |
| S17 | 4.488 | 6.75E−04 | 9.77E−06 | 1.26E−07 |

Parameters relating to above conditions (1) to (9) for the wide-angle lens assembly of the fourth embodiment are listed in Table 15.

TABLE 15

| GAR1 | GBR1 | GBR2 | G3R2 | G6R2 | G7R2 | VB |
|---|---|---|---|---|---|---|
| 37.08 | 22.27 | −14.17 | −11.00 | −34.24 | 11.77 | 70.00 |

| G7R1 | G5R1 | f3 | f4 | f6 | f8 |
|---|---|---|---|---|---|
| −21.23 | 22.27 | −37.95 | 13.22 | 13.4 | 7.76 |

The values calculated based on conditions (1) to (9) for the parameters of the wide-angle lens assembly of the fourth embodiment are listed in Table 16. It can be seen from Table 16 that the wide-angle lens assembly of the fourth embodiment satisfies conditions (1) to (9).

TABLE 16

| Condition (1) | Condition (2) | Condition (3) | Condition (4) | Condition (5) |
|---|---|---|---|---|
| 26.62 | 20.98 | −24.73 | −1.21 | 0.09 |

| Condition (6) | Condition (7) | Condition (8) | Condition (9) |
|---|---|---|---|
| −1.02 | −0.61 | 0.17 | −25.17 |

In addition, the wide-angle lens assembly of the fourth embodiment meets the requirements of optical performance. It can be seen from FIG. 5B that the field curvature ranges from −0.16 mm to 0.04 mm. It can be seen from FIG. 5C that the distortion ranges from −22.5% to 0%. It can be seen from FIG. 5D that the longitudinal aberration ranges from −0.014 mm to 0.002 mm. It is apparent that the field curvature, distortion and longitudinal aberration of the wide-angle lens assembly of the fourth embodiment can be corrected effectively and resolution is excellent.

The lens assembly of the present invention meets various conditions, which are emphasized particularly by (1) $21.02 \leq f4+f6 \leq 26.89$; (2) $18.66 \leq f4+f8 \leq 23.13$; (3) $-25.66 \leq f4+f3 \leq -5.19$; (4) $-1.29 \leq (G7R2-G6R2)/f3 \leq -0.62$; (5) $-0.06 \leq (G7R1/G3R2)/G5R1 \leq 0.12$; (6) $-5 \leq (GBR1+G6R2)/G7R2 \leq 16$; (7) $-0.64 \leq (G7R2+G6R2)/GAR1 \leq -0.03$; (8) $-0.72 \leq G7R2/VB \leq 2.15$; (9) $-50 \leq GBR2-G3R2 \leq 28$. Also, the values in various embodiments of the present invention fall into the range of these conditions. The conditions (1) and (2) help decrease the angle of major light rays on the image plane IMA and increase an amount of light at the periphery. The conditions (3), (4), (5) and (7) help reduce curvature of image surfaces and improve performance on color aberration under magnification. The condition (6) can further correct curvature of image surfaces. The condition (8) helps correct longitudinal color aberration. The condition (9) leads to a better performance of spherical aberration. Therefore, the wide-angle lens assembly of the present invention has advantages of small curvature of image surfaces and excellent performance of color aberration under magnification and has high quality of imaging.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A wide-angle lens assembly comprising, in an order from an object side to an image side along an optical axis:
    a first lens element with negative refractive power, having an image-side surface being concave;
    a second lens element with negative refractive power, having an image-side surface being concave;
    a third lens element with negative refractive power;
    a fourth lens element with positive refractive power;
    a fifth lens element with a refractive power;
    a sixth lens element with positive refractive power, having an object-side surface being convex and an image-side surface being convex;
    a seventh lens element with negative refractive power; and
    an eighth lens element with positive refractive power, having an object-side surface being convex and an image-side surface being convex;
    wherein wide-angle lens assembly further comprises an aperture stop disposed between two adjacent lens elements among the first lens element to the eighth lens element;
    wherein the wide-angle lens assembly at least satisfies one of the following conditions:

$-0.64 \leq (G7R2+G6R2)/GAR1 \leq -0.03$; and $-1.29 \leq (G7R2-G6R2)/f3 \leq -0.62$, wherein GAR1 is a radius of curvature of the object-side surface of a first one of lens elements located in front of the aperture stop, G6R2 is a radius of curvature of the image-side surface of the sixth lens element, G7R2 is a radius of curvature of the image-side surface of the seventh lens element, and f3 is effective focal length of the third lens element,
    wherein the wide-angle lens assembly further satisfies at least one of the following conditions:

$-25.66 \leq f4+f3 \leq -5.19$;

$21.02 \leq f4+f6 \leq 26.89$;

$18.66 \leq f4+f8 \leq 23.13$;

wherein f4 is effective focal length of the fourth lens element, f6 is effective focal length of the sixth lens element, and f8 is effective focal length of the eighth lens element.

2. The wide-angle lens assembly of claim 1, wherein the object-side surface of the third lens element is concave, the image-side surface of the fifth lens element is convex, and the image-side surface of the seventh lens element is concave.

3. The wide-angle lens assembly of claim 2, wherein the image-side surface of the third lens element is convex, and the object-side surface of the fifth lens element is concave.

4. The wide-angle lens assembly of claim 3, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

5. The wide-angle lens assembly of claim 2, wherein the image-side surface of the third lens element is convex, and the object-side surface of the seventh lens element is concave.

6. The wide-angle lens assembly of claim 5, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

7. The wide-angle lens assembly of claim 2, wherein the object-side surface of the fifth lens element is convex.

8. The wide-angle lens assembly of claim 7, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

9. The wide-angle lens assembly of claim 2, wherein the image-side surface of the third lens element is concave, and the object-side surface of the seventh lens element is convex.

10. The wide-angle lens assembly of claim 9, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

11. The wide-angle lens assembly of claim 1, further comprising a ninth lens element disposed between the first lens element and the third lens element.

12. The wide-angle lens assembly of claim 11, wherein the ninth lens element has negative refractive power and has an object-side surface being convex and an image-side surface being concave.

13. The wide-angle lens assembly of claim 12, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

14. The wide-angle lens assembly of claim 1, wherein a lens element disposed along a direction from the aperture stop to the object side is a lens element located in front of the aperture stop, a lens element disposed along a direction from the aperture stop to the image side is a lens element located behind the aperture stop, and wherein at least one lens element is located in front of the aperture stop, and at least one lens element is located behind the aperture stop.

15. The wide-angle lens assembly of claim 14, wherein the wide-angle lens assembly at least satisfies one of the following conditions:

$-0.06 \leq (G7R1/G3R2)/G5R1 \leq 0.12$;

$-5 \leq (GBR1+G6R2)/G7R2 \leq 16$;

$-50 \leq GBR2+G3R2 \leq 28$; and $-0.72 \leq G7R2/VB \leq 2.15$;

wherein GBR1 is a radius of curvature of the object-side surface of a first one of lens elements located behind the aperture stop, GBR2 is a radius of curvature of the image-side surface of a first one of lens elements located behind the aperture stop, G3R2 is a radius of curvature of the image-side surface of the third lens element, G5R1 is a radius of curvature of the object-side surface of the fifth lens element, G6R2 is a radius of curvature of the image-side surface of the sixth lens element, G7R1 is a radius of curvature of the object-side surface of the seventh lens element, G7R2 is a radius of curvature of the image-side surface of the seventh lens element, and VB is an Abbe number of a first one of lens elements located behind the aperture stop.

16. A wide-angle lens assembly comprising, in an order from an object side to an image side along an optical axis:
a first lens element with negative refractive power, having an image-side surface being concave;
a second lens element with negative refractive power, having an image-side surface being concave;
a third lens element with negative refractive power;
a fourth lens element with positive refractive power;
a fifth lens element with a refractive power;
a sixth lens element with positive refractive power, having an object-side surface being convex and an image-side surface being convex;
a seventh lens element with negative refractive power; and
an eighth lens element with positive refractive power, having an object-side surface being convex and an image-side surface being convex;
wherein wide-angle lens assembly further comprises an aperture stop disposed between two adjacent lens elements among the first lens element to the eighth lens element;
wherein the wide-angle lens assembly at least satisfies one of the following conditions:

$-0.64 \leq (G7R2+G6R2)/GAR1 \leq -0.03$; and $-1.29 \leq (G7R2-G6R2)/f3 \leq -0.62$, wherein GAR1 is a radius of curvature of the object-side surface of a first one of lens elements located in front of the aperture stop, G6R2 is a radius of curvature of the image-side surface of the sixth lens element, G7R2 is a radius of curvature of the image-side surface of the seventh lens element, and f3 is effective focal length of the third lens element, wherein the wide-angle lens assembly further comprises a ninth lens element disposed between the first lens element and the third lens element.

17. The wide-angle lens assembly of claim 16, wherein the ninth lens element has negative refractive power and has an object-side surface being convex and an image-side surface being concave.

18. The wide-angle lens assembly of claim 16, wherein the image-side surface of the third lens element is convex, and the object-side surface of the seventh lens element is concave.

19. The wide-angle lens assembly of claim 16, wherein the object-side surface of the fifth lens element is convex.

\* \* \* \* \*